United States Patent
Seres

[15] 3,707,265
[45] Dec. 26, 1972

[54] NOZZLE FOR AN INJECTION MOLDING MACHINE

[72] Inventor: Alex Seres, Fraser, Mich.

[73] Assignee: Incoe Corp., Troy, Mich.

[22] Filed: March 3, 1971

[21] Appl. No.: 104,293

[52] U.S. Cl...............................239/601, 264/329
[51] Int. Cl.................................................B29f 1/08
[58] Field of Search....239/453, 533, 601; 18/30 NV, 18/30 NW, 30 RV, 14 V, 5 P; 264/329

[56] References Cited

UNITED STATES PATENTS

| 3,520,026 | 7/1970 | Stidham et al. | 264/329 X |
| 3,550,864 | 12/1970 | East | 239/601 |
| 2,460,831 | 2/1949 | Kovacs | 264/329 |
| 3,010,155 | 11/1961 | Gilmore | 264/329 |
| 3,192,299 | 6/1965 | Hendry | 264/329 X |

Primary Examiner—M. Henson Wood, Jr.
Assistant Examiner—Michael Y. Mar
Attorney—Harness, Dickey & Pierce

[57] ABSTRACT

A nozzle for a plastic injection molding machine having an axially extending orifice and a flow passage of annular cross-section communicating with the orifice. The flow passage is defined in part by a radially and axially converging radially outward wall with the rate of radical convergence increasing as the orifice is approached.

6 Claims, 6 Drawing Figures

PATENTED DEC 26 1972

3,707,265

INVENTOR.
Alex Seres
BY
Harness, Dickey & Pierce
ATTORNEYS.

NOZZLE FOR AN INJECTION MOLDING MACHINE

BACKGROUND AND SUMMARY OF THE INVENTION

The present invention relates generally to nozzles for plastic injection molding machines, and particularly, to nozzles which have an axially extending orifice communicating with a flow passage formed in part by a radially and axially converging radially outward wall. An illustrative example of a nozzle of the above type may be found in the patent to Gilmore, U.S. Pat. No. 3,010,155, issued Nov. 28, 1961.

Generally, an orifice for an injection molding nozzle may be defined by its diameter and the length of its land. In practice, it is often found that the initially established diameter of the orifice is too small to provide an adequate or optimum flow of plastic into a mold. The flow rate may be increased by increasing the diameter of the orifice. Since the radially outward wall of the nozzle flow passage converges, an increase in the diameter of the orifice results in an increase in the orifice land. Obviously, an orifice of an increased diameter will result in a gate or sprue of correspondingly increased diameter. Additionally, the distance that the gate axially extends from the molded part will be increased. At times, the axial extension of the gate is disproportionately increased by virtue of the increase in the orifice diameter. Although an increase in gate diameter can usually be tolerated, a substantially disproportionate increase in the axial extension of the gate often cannot be tolerated.

The present invention provides an injection molding machine nozzle which has a flow passage configuration allowing an increase in the diameter of the nozzle orifice to provide an increased rate of flow of plastic material with a reduced increase in the orifice land as compared to the above-described prior art nozzles. Importantly, it has been found that the gate formed by a nozzle according to the present invention does not disproportionately increase in axial extension due to the increase in orifice diameter.

In an exemplary nozzle according to this invention, a nozzle body is provided having a generally axially extending orifice communicating with a flow passage of annular cross-section for the plastic material which has a radially outward radially and axially converging wall with the rate convergence of the wall increasing as the orifice is approached. The radial and axial convergence of the wall of the cavity is preferably continuous and gradual to avoid flow discontinuities. The nozzle may have a core or torpedo member coaxially disposed within the cavity which may contain a heater for maintaining the plastic material within the nozzle in a molten condition.

DETAILED DESCRIPTION OF THE PREFERRED EMBODIMENT

Figure 1:
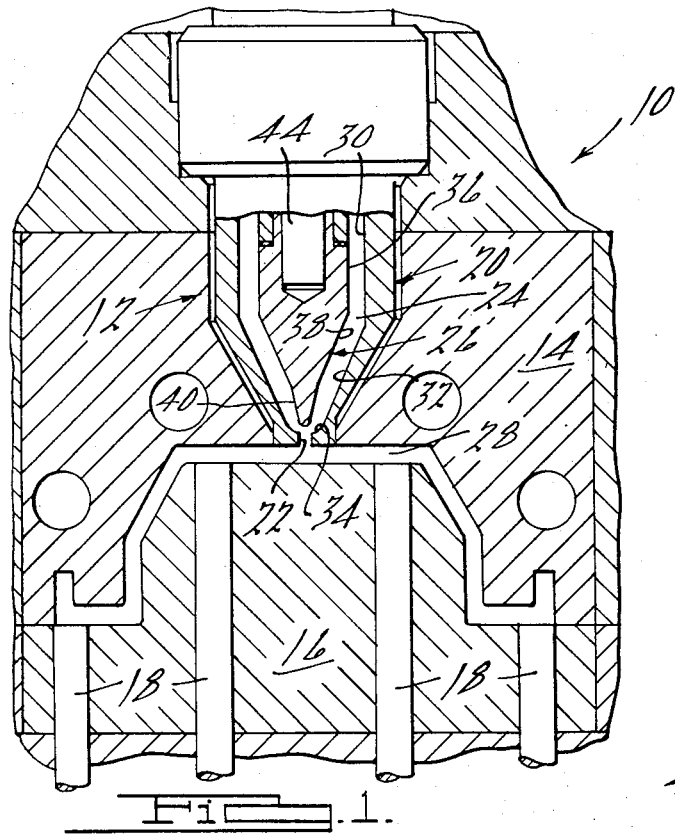
FIG. 1 is a cross-sectional view of an assembly for an injection molding machine including an exemplary nozzle according to this invention and a pair of mold dies forming a mold cavity communicating with the nozzle.

In FIG. 1, a portion of an injection molding machine 10 is illustrated which includes a nozzle assembly 12, a female die 14, a male die 16, and a plurality of ejector rods 18. The nozzle 12 has a body 20 with an axially extending orifice 22 and flow passage 24 for plastic material communicating with the orifice 22. The orifice 22 is preferably a cylindrical bore and may be generally defined by its land dimension, i.e., axial length, and by its cross-sectional size, i.e., diameter. The nozzle 12 may have a coaxially disposed central core or torpedo 26. As can be seen in FIG. 1, the orifice 22 communicates with a mold cavity 28 formed by the mating female and male dies 14 and 16, respectively.

The flow passage 24 is radially outwardly defined by a cylindrical wall portion 30 of the housing 22, a radially and axially converging first wall portion 32, and a radially and axially converging second wall portion 34 which is proximate to the orifice 22. As can be best seen in FIG. 2, the wall portion 32 is conical, i.e., the wall portion 32 radially and axially converges at a constant rate, while the wall portion 34 radially converges at an increasing rate as the orifice 22 is approached. The wall portion 34 preferably converges in a continuous manner to provide a smooth, continuous surface thereby avoiding flow discontinuities.

Referring again to FIG. 1, the core or torpedo member 26 has an outer surface radially inwardly defining the flow passage 24 which includes a cylindrical surface portion 36 which is generally radially opposite the cylindrical surface portion 30 of the body 22, a conical surface portion 38 which is generally radially opposite the conical surface portion 32, and a conical surface portion 40 which terminates in a blunt end 42 and is generally radially opposite the converging surface portions 32 and 34. The torpedo 26 has provision for a heater in a central cavity 44.

Figure 2:
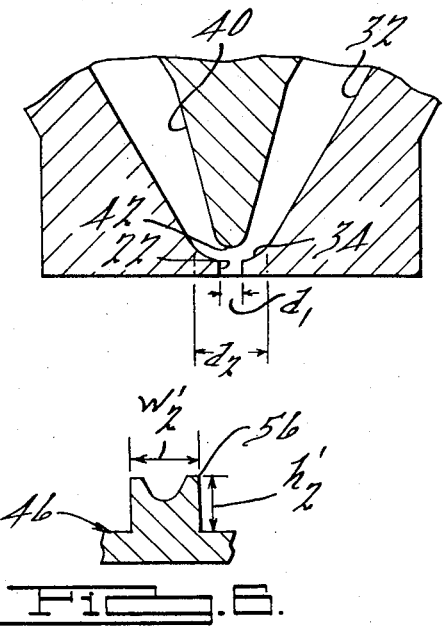
FIG. 2 is a detailed cross-sectional view of a portion of the nozzle of FIG. 1.
Figure 3:
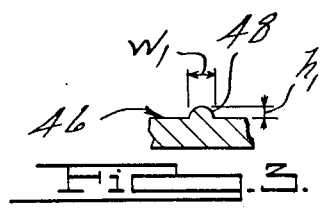
FIG. 3 is a cross-sectional view of a portion of a part molded by the nozzle of FIGS. 1 and 2 illustrating the gate formed by the nozzle.
Figures 4, 6:
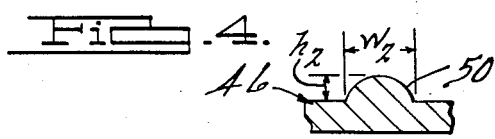
FIG. 4 is a cross-sectional view of a portion of a part molded by the nozzle of FIGS. 1 and 2 after an enlargement of the nozzle orifice.
FIG. 6 is a cross-sectional view of a part molded by an exemplary prior art nozzle illustrating a typical gate formed by the prior art nozzle after enlargement of the diameter of the nozzle orifice.

With reference now to FIG. 3 in which a part 46 is shown having a representative gate 48 formed by the nozzle 12 of FIGS. 1 and 2, it will be appreciated that the width w of the gate 48 is determined in significant part by the diameter d of the orifice 22, of the nozzle 12. Consequently, an increase in the diameter of the orifice 22 to a diameter $d_2$ as illustrated by dashed lines will provide a corresponding increase in the width of the gate 50 to a width $w_2$ as shown in FIG. 4. It can also be seen that the height $h_2$ of the gate 50 is greater than the $h_1$ of the gate 48 and that the gates 48 and 50 generally have a similar hemispherical configuration. It has been found that with prior art nozzles, the increase in the height of the gate consequent to an increase in the orifice diameter has been disproportionately large, and additionally, the configuration of the sprue is often changed to a less desirable configuration. A representative illustration of the change in sprue configuration and size due to an increase of the orifice diameter of a prior art nozzle will be explained in greater detail with respect to FIG. 6.

Figure 5:
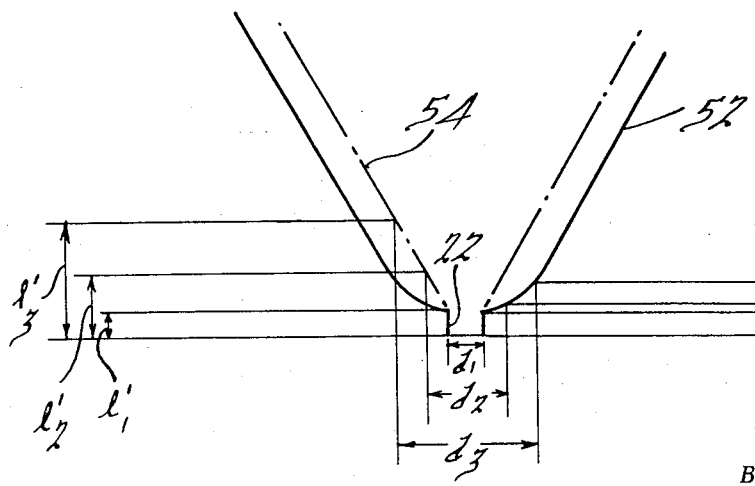
FIG. 5 is a graphic illustration of the effect of changes in the diameter of the nozzle orifice on land size for the nozzle of FIGS. 1 and 2 and for an exemplary nozzle of the prior art.

In FIG. 5, a converging radially outward wall of a nozzle flow passage according to this invention is illustrated by a solid line 52. A typical converging radially outward wall of a prior art nozzle such as that disclosed in the aforementioned U.S. Pat. to Gilmore No. 3,010,155, issued Nov. 28, 1961, is illustrated by a dashed line 54. In FIG. 5, three orifice diameters $d_1$, $d_2$ and $d_3$ are illustrated which exemplify progressive increases in the diameter of the orifice. A left vertical scale is shown which illustrates the relationship between orifice diameter and orifice land for the prior art nozzle, and particularly, orifice land dimensions $l_1$, $l_2$, and $l_3$ are shown for corresponding increasing orifice diameters $d_1$, $d_2$, and $d_3$, respectively. A right vertical scale is also shown which illustrates the relationship between orifice diameter and orifice land for a nozzle according to this invention, and particularly, orifice land dimensions $l_1$, $l_2$, and $l_3$ are shown for the corresponding increasing diameters $d_2$, $d_2$, and $d_3$, respectively. It can be seen that the increase in land dimension for a given increase in orifice diameter is less for a nozzle of the present invention than for the aforementioned prior art nozzle. The lesser rate of increase is attributable to the increasing rate of convergence of the radially outward passage wall as taught by this invention. Consequently, it will be appreciated that increases in the size of the orifice 22 are preferably limited so as to be within the range of the wall portion of increased convergence to obtain full benefit of the nozzle configuration of this invention.

It was found that with prior art nozzles having flow passages with uniformly converging radially outward walls, an increase of the diameter of the orifice, for example, from $d_1$ to $d_2$, a gate of dramatically increased axial extension resulted, and additionally, the resulting gate had sharp upper edges as illustrated in FIG. 6. It will be appreciated that the gate configuration and dimensions achieved with the nozzle according to this invention as illustrated in FIG. 4 constitutes a significant improvement.

In view of the foregoing description of an exemplary nozzle according to this invention, it will be appreciated that the nozzle orifice can be increased, for example, by drilling, to increase the flow rate of plastic into a mold without detrimentally effecting the gate produced by the nozzle. Accordingly, a single basic design may be used to satisfactorily accomodate a significant range of flow rates.

While it will be apparent that the teachings herein are well calculated to each one skilled in the art the method of making preferred embodiment of this invention, it will be appreciated that the invention is susceptible to modification, variation and change without departing from the proper scope of meaning of the subjected claims.

What is claimed is:

1. A nozzle for a plastic injection molding machine comprising: body means having an orifice and a coaxially disposed flow passage communicating with said orifice for flow of plastic material to said orifice, said orifice having a predetermined initial cross-sectional size and land dimension, said flow passage being at least in part defined by a radially outward coaxial wall of circular cross section, said radially outward wall having a first wall portion which radially and axially converges toward said orifice with said radial convergence being at a first predetermined rate with respect to said axial convergence and a second wall portion which radially and axially converges toward said orifice with said radial convergence being at a second predetermined rate with respect to said axial convergence, said second predetermined rate being greater than said first rate, said second wall portion being proximate to said orifice and intermediate said orifice and said first wall portion, said body means being adaptable for radial enlargement of said orifice cross-sectional size by removal of at least a part of said second wall portion whereupon said land dimension increases generally in accordance with the increased rate of convergence of said second wall portion.

2. A nozzle according to claim 1 wherein said first wall portion radially converges at a constant rate as said orifice is approached, and said second wall portion radially converges at a generally increasing rate as said orifice is approached.

3. A nozzle according to claim 2 wherein the rate of increase of said second rate is progressive and said first and second wall portions merge to provide a smooth and continuous radially outward wall.

4. A nozzle according to claim 1 wherein said orifice is a circular cylindrical bore in said nozzle having a predetermined initial diameter.

5. A nozzle according to claim 1 wherein said flow passage has an annular cross-section.

6. A nozzle according to claim 5 wherein said nozzle further includes a coaxially disposed nozzle core providing a radially-inward wall for said annular flow passage.

* * * * *